US007289690B2

(12) United States Patent
Li et al.

(10) Patent No.: US 7,289,690 B2
(45) Date of Patent: Oct. 30, 2007

(54) PHOTONIC CRYSTAL DEVICE FOR FLUID SENSING

(75) Inventors: Zhiyong Li, Palo Alto, CA (US); Raymond G. Beausoleil, Redmond, WA (US); Philip J. Kuekes, Menlo Park, CA (US); Shih-Yuan Wang, Palo Alto, CA (US); M. Saif Islam, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/107,098

(22) Filed: Apr. 15, 2005

(65) Prior Publication Data

US 2006/0233481 A1  Oct. 19, 2006

(51) Int. Cl.
*G02B 6/00* (2006.01)
(52) U.S. Cl. .......................... 385/12; 385/14
(58) Field of Classification Search .................. 385/12
See application file for complete search history.

(56) References Cited

U.S. PATENT DOCUMENTS

| | | | |
|---|---|---|---|
| 5,999,308 A * | 12/1999 | Nelson et al. ............. | 359/321 |
| 6,542,682 B2 | 4/2003 | Cotteverte et al. | |
| 6,631,236 B2 | 10/2003 | Yamada et al. | |
| 6,944,384 B2 * | 9/2005 | Loncar et al. ............. | 385/129 |
| 2003/0068152 A1 * | 4/2003 | Gunn, III .................. | 385/129 |
| 2004/0079278 A1 | 4/2004 | Kamins et al. | |
| 2004/0082178 A1 | 4/2004 | Kamins et al. | |
| 2004/0091224 A1 * | 5/2004 | Baumberg et al. ......... | 385/129 |
| 2004/0252957 A1 | 12/2004 | Schmidt et al. | |

OTHER PUBLICATIONS

Cheng, Norman K.Y., "[DARPA] University Opto Centers Program: PI Meeting," Center for Bio-Optoelectronic Sensor Systems (Nov. 27, 2001).
Islam, et. al., "Ultrahigh-Density Silicon Nanobridges Formed Between Two Vertical Silicon Substrates," Nanotechnology 15 L5-L8 (2004).

* cited by examiner

*Primary Examiner*—Tina M. Wong

(57) ABSTRACT

An apparatus for sensing at least one property of a fluid is described. A first photonic crystal structure and a second photonic crystal structure are defined in a dielectric slab. The first and second photonic crystal structures comprise differently patterned arrays of channels extending through the dielectric slab. The apparatus further comprises a fluid introduction device configured to introduce a common volume of the fluid into the channels of the first and second photonic crystal structures. The at least one property of the fluid can be sensed by measuring the propagation of radiation through the first and second photonic crystal structures.

25 Claims, 4 Drawing Sheets

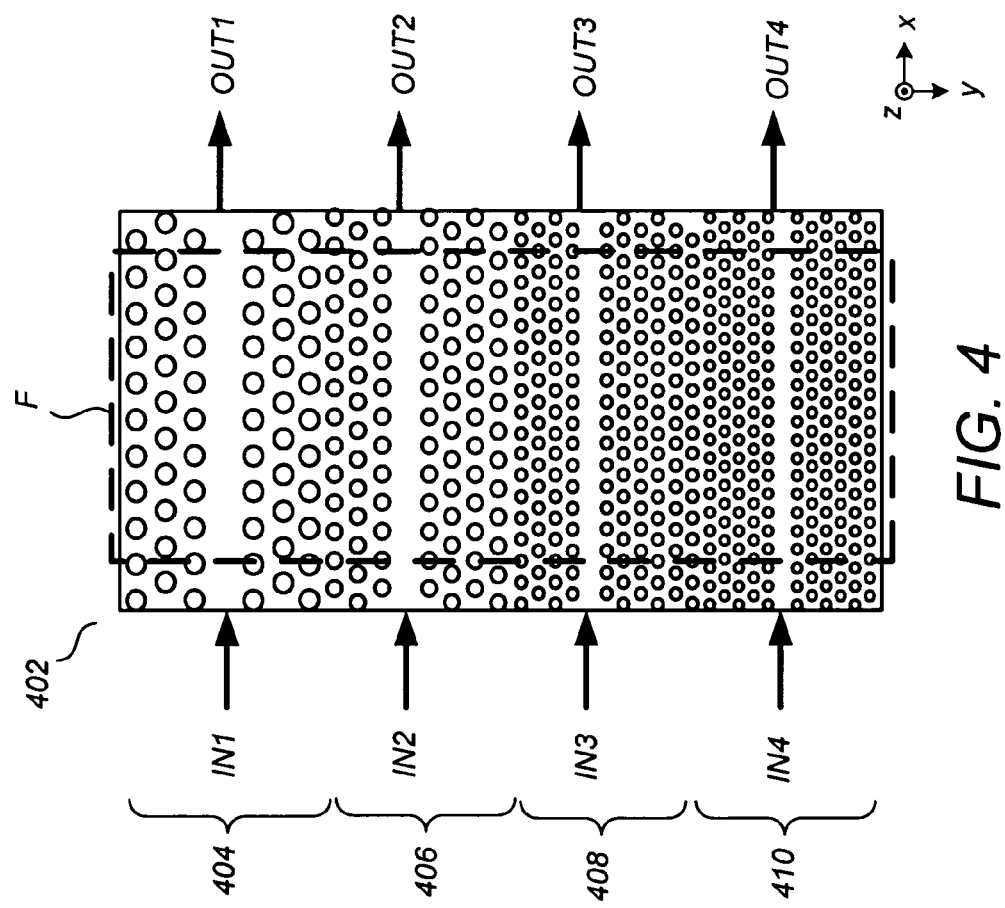
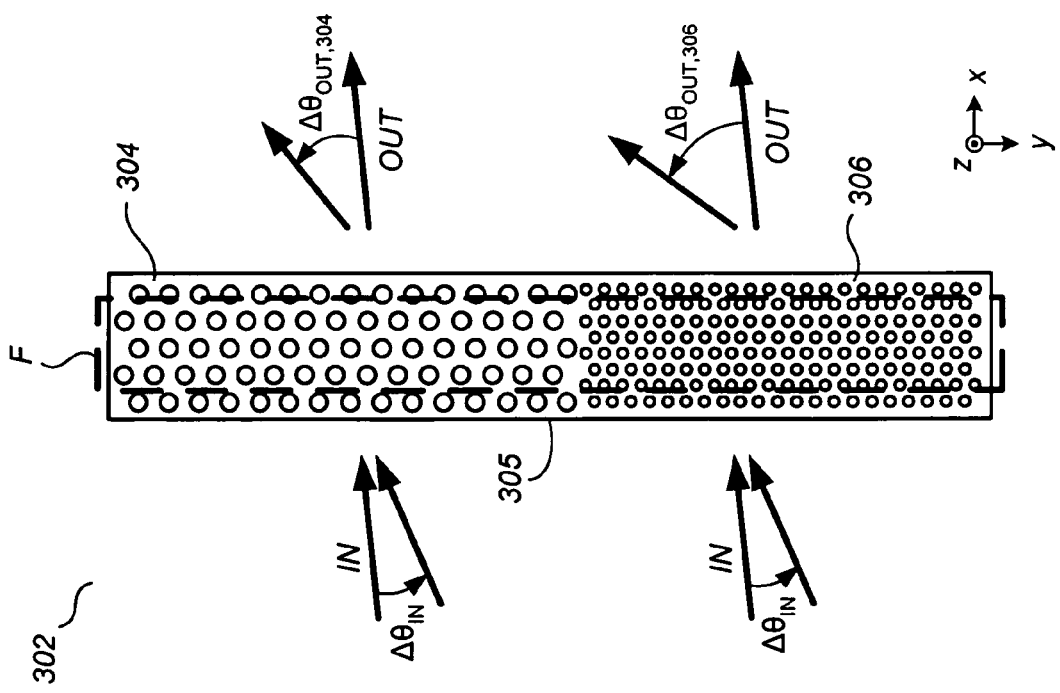

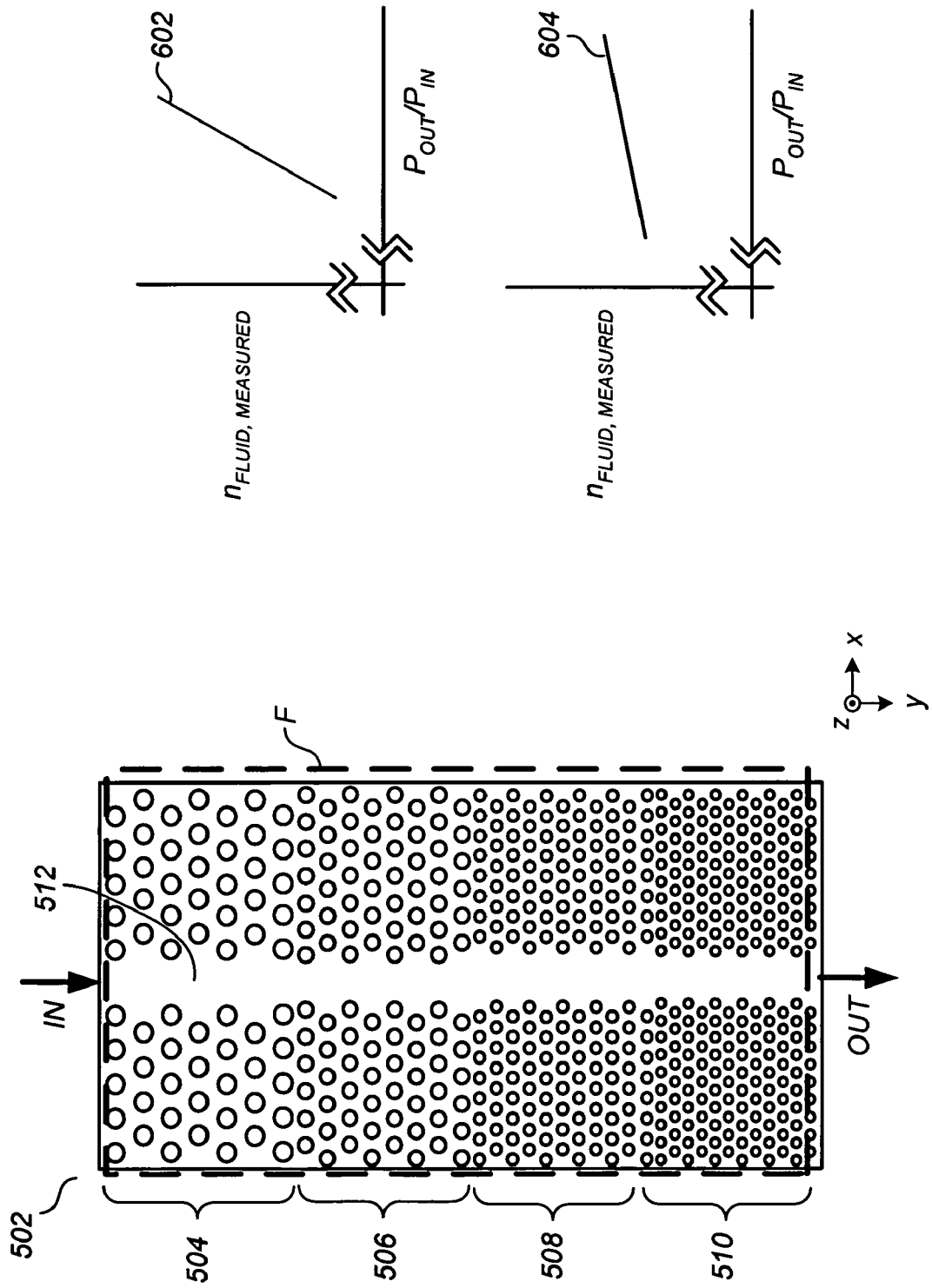

PHOTONIC CRYSTAL DEVICE FOR FLUID SENSING

FIELD

This patent specification relates to photonic crystal devices configured for sensing one or more properties of a fluid.

BACKGROUND

A photonic crystal comprises an artificially engineered periodic dielectric array having at least one photonic bandgap, i.e., a range of frequencies in which ordinary electromagnetic wave propagation is strictly forbidden. The presence of these photonic bandgaps can be used to confine and guide electromagnetic waves for any of a variety of useful purposes. Guidance and confinement can be achieved by the judicious introduction of defect regions, i.e., missing or differently-shaped portions of the periodic array, within which the electromagnetic waves are permitted to exist and wherealong the electromagnetic waves can be confined and guided. Photonic crystals can exhibit special properties such as a so-called superprism effect in which, for certain frequencies, very small changes in the angle of incidence can cause very large changes in the angle of refraction. Proposals have even been made for negatively refracting photonic crystals, bringing about the possibility of so-called flat lenses or superlenses unfettered by diffraction limitations or alignment issues.

A two-dimensional photonic crystal typically comprises a horizontal slab of a bulk material into which a patterned array of vertical columns is formed, the vertical columns being occupied by a column material having a refractive index substantially different than that of the bulk material. The propagation of optical signals in these structures is determined by a variety of parameters including, for example, the cross-sectional shape of the columns, the cross-sectional dimension(s) of the columns, the inter-column pitch, the structural symmetry of the patterned array (e.g., square, hexagonal, etc.), the nature, shape, and size of any defect patterns in the photonic crystal, and the particular refractive index values of the bulk material and column material at the frequencies of interest.

Proposals have been made for dynamically modulating photonic crystals in various ways including, for example, applying external mechanical forces to cause small dimensional variations in the photonic crystal, and applying external control radiation to nonlinear bulk and/or column materials. In another proposal, solid dielectric rods are lowered into, and raised out of, air-filled columns to provide modulation. In still another proposal, microfluidic pumps reversibly fill the air holes with a fluid to change the refractive index of the columns and therefore modulate the properties of the photonic crystal.

Issues remain, however, with respect to a converse goal of performing microfluidic sensing using photonic crystal materials, i.e., sensing a property of a fluid occupying the columns by virtue of its impact on electromagnetic propagation through the photonic crystal. Such issues include, but are not limited to, device precision, sensitivity to environmental conditions, ease and effectiveness of calibration, and flexibility for different ranges of fluid parameters. Other issues remain as would be apparent to one skilled in the art upon reading the present disclosure.

SUMMARY

In accordance with an embodiment, an apparatus is provided for sensing at least one property of a fluid. The apparatus comprises a dielectric slab into which is defined a first photonic crystal structure and a second photonic crystal structure. The first and second photonic crystal structures comprise differently patterned arrays of channels extending through the dielectric slab. The apparatus further comprises a fluid introduction device configured to introduce a common volume of the fluid into the channels of the first and second photonic crystal structures. The at least one property of the fluid can be sensed by measuring the propagation of radiation through the first and second photonic crystal structures.

Also provided is a method comprising introducing a common volume of a fluid into a plurality of columnar channels formed in a dielectric slab. The channels define an array of photonic crystals in the dielectric slab, each photonic crystal in the array having a different channel pattern than the other photonic crystals in the array. Electromagnetic radiation is introduced into the array of photonic crystals, and at least one property of the fluid is sensed by measuring the propagation of the electromagnetic radiation through the array of photonic crystals.

Also provided is a fluid sensing device, comprising a first photonic crystal and a second photonic crystal formed into a common slab of bulk material. The first and second photonic crystals comprise differently patterned arrays of channels extending through the common slab. The device further comprises means for introducing a common volume of the fluid into the channels of the first and second photonic crystals. The device further comprises means for introducing electromagnetic radiation into the photonic crystals, and means for measuring the propagation of the electromagnetic radiation through the photonic crystals to sense at least one property of the fluid.

BRIEF DESCRIPTION OF THE DRAWINGS

FIG. 3 illustrates a top view of an apparatus for sensing at least one property of a fluid according to an embodiment;

FIG. 4 illustrates a top view of an apparatus for sensing at least one property of a fluid according to an embodiment;

FIG. 5 illustrates a top view of an apparatus for sensing at least one property of a fluid according to an embodiment; and FIG. 6 illustrates conceptual graphs of increased precision in determining refractive index from signal attenuation values.

DETAILED DESCRIPTION

Figure 1:
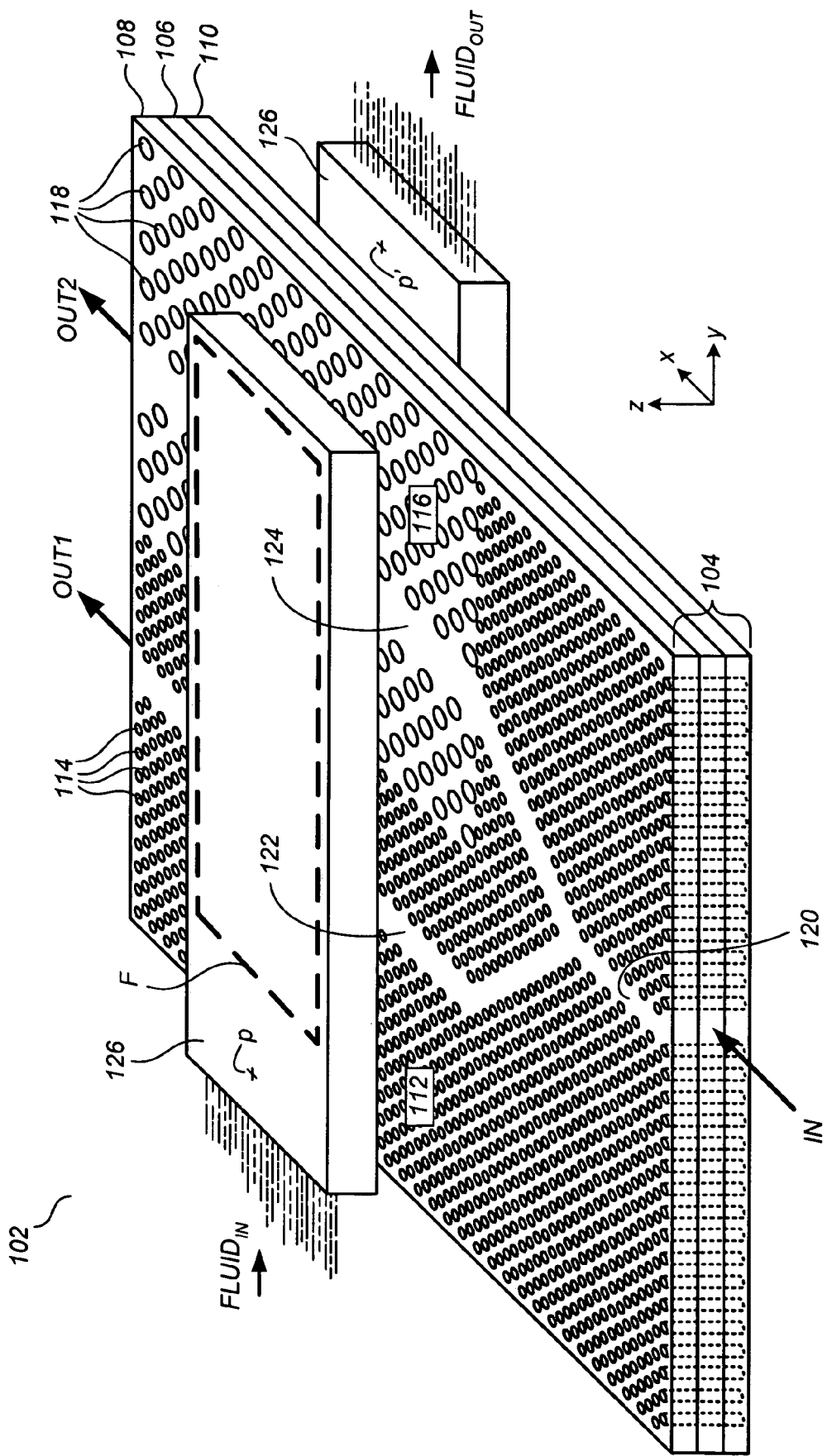
FIG. 1 illustrates a conceptual perspective view of an apparatus for sensing at least one property of a fluid according to an embodiment.

FIG. 1 illustrates an apparatus 102 for sensing at least one property of a fluid according to an embodiment. In one embodiment, the property being sensed is a refractive index of the fluid, although the scope of the present teachings is not so limited. More generally, the property being sensed can be any property of a fluid, whether currently known or hereinafter discovered, that can have an effect on the propagation of electromagnetic radiation through a photonic crystal when channels thereof are filled with the fluid. Fluid broadly refers to any substance capable of flowing and includes, but is not limited to, solvents into which solutes are dissolved, and liquid phases of a first material into which solid or semi-solid phases of a second material is suspended. In the case of solutions and suspensions in which the fluid is heterogeneous, the property being sensed, such as refractive index, may be indicative of an amount or concentration of solute or other material that is dissolved or suspended.

By way of example only, and not by way of limitation, typical material parameters and dimensions may be set forth hereinbelow for uses in which the applied electromagnetic radiation is an optical signal in the 1550 nm range that is typical for optical communications. It is to be appreciated, however, that using a variety of other radiation wavelengths including, but not limited to, the ultraviolet, visible, and infrared ranges, is within the scope of the present teachings.

Apparatus 102 includes a group 104 of material layers including a photonic crystal bulk layer 106, an upper cladding layer 108, and a lower cladding layer 110. The index of refraction of the materials used for each of the upper and lower cladding layers 108 and 110 is less than the index of refraction of the material used for the bulk layer 106 to provide for vertical confinement (i.e., in the z-direction of FIG. 1) of an optical signal "IN." Pluralities of vertically columnar channels 114 and 118 are formed in the group 104 of material layers and are patterned such that a first photonic crystal 112 and a second photonic crystal 116 are defined therein. The channels 114 and 118 are patterned such that the photonic crystals 112 and 116 each have at least one photonic bandgap.

According to an embodiment, the channel patterns of the photonic crystals 112 and 116 differ with respect to at least one of channel pitch, channel cross-sectional shape, type of spatial pattern, and channel cross-sectional size, such that one or more differences exists between the photonic bandgap characteristics of the photonic crystals 112 and 116. As used herein, a photonic bandgap characteristic refers to one or more properties of a photonic crystal associated with its photonic bandgap. Examples of photonic bandgap characteristics include, but are not limited to: center frequency of the bandgap, width of the bandgap, attenuation characteristics within or near the fringes of the bandgap, any directionally-specific or polarization-specific behaviors of any such characteristic, and any effects of external modulation or self-modulation on any such characteristic. In the particular example of FIG. 1, the first photonic crystal 112 has a channel pattern that differs from that of the second photonic crystal 116 with respect to cross-sectional channel size and channel pitch.

By way of example and not by way of limitation, the bulk layer 106 may comprise a relatively high-index material such as Si (n=3.42), InP (n=3.1), or SiN (n=3.55). More generally, suitable materials include, but are not limited to, Group IV materials (e.g., Si, Ge, SiC), Group III-V materials (e.g., GaN, GaP, InP, InAs, AlN), and Group II-VI materials (e.g., ZnO, CdS). Even more generally, virtually any material can be used that has a relatively high refractive index compared to a refractive index of the fluid to be sensed, that is at least partially non-attenuating at the frequencies of interest, and that is capable of being processed or otherwise fabricated to contain the channels 114 and 118.

In one embodiment, the material used for the cladding layers 108 and 110 comprises $SiO_2$ (n=1.44) or poly-dimethyl siloxane (PDMS, n=1.4), each having a refractive index lower than that of the material used for the bulk layer 106. In one particularly practical embodiment, the cladding layers 108 and 110 comprise $SiO_2$ and the bulk layer 106 comprises crystalline Si. Use of such materials is particularly practical because there are a variety of known selective, non-selective, anisotropic, and isotropic etchants and etching methods that can be used to form the apparatus 102 of FIG. 1 using such materials.

In other embodiments, one or both of the cladding layers 108 and 110 can be omitted altogether, with vertical confinement of the optical signal simply being provided by air (n=1) and/or the fluid that is being sensed. Because highly precise refractive index ratios in the vertical direction are not usually required for maintaining vertical confinement of the optical signal, the fluid occupying the space directly above and/or below the bulk layer can itself serve as a cladding for vertical confinement purposes.

In one embodiment, the bulk layer 106 may have a thickness of 2 μm-8 μm and the channels 114/118 may be cylindrical columns arranged in hexagonal lattices. The diameter of the channels 114 for the photonic crystal 112 may be about 100-200 nm with inter-center spacings of about 200-400 nm, while the diameter of the channels 118 for the photonic crystal 116 may be about 200-400 nm with inter-center spacings of about 400-800 nm. In another embodiment, the bulk layer 106 may have a thickness of 1 μm-16 μm, the diameter of the channels 114 may be about 50-400 nm with inter-center spacings of about 100-800 nm, and the diameter of the channels 118 may be about 100-800 nm with inter-center spacings of about 200 nm-1.6 μm. However, these values are presented by way of non-limiting example only, with a wide variety of different slab materials, slab thicknesses, channel spacings/pitches, channel cross-sectional shapes, spatial patterns, and channel cross-sectional sizes being within the scope of the present teachings.

As illustrated in FIG. 1, photonic crystals 112 and 116 comprise defect pattern waveguides 122 and 124, respectively, along which input radiation at a frequency in or near the photonic bandgap is guided to produce output signals OUT1 and OUT2. An input waveguide 120 is provided that splits an optical signal "IN" and introduces the split radiation portions into the defect pattern waveguides 122 and 124. Although shown as itself being a defect pattern waveguide formed in a front portion of the photonic crystal 112, which can be advantageous in terms of low input signal loss, it is not required that the input waveguide 120 be a defect pattern waveguide or that it be contained in a common slab with the photonic crystals 112 and 116. Rather, any radiation introduction device capable of introducing radiation into the defect pattern waveguides 122 and 124 can be used including, but not limited to, any of a variety of known radiation sources and optical circuits. Radiation measurement devices (not shown) for detecting/measuring the output signals OUT1 and OUT2 are also provided which can comprise, for example, commercially available photodetectors. However, the particular type of radiation measurement device will depend on the particular propagative effects that are being measured, such as attenuations, phase shifts, other temporal modulations, etc., and therefore a wide variety of different detection devices can be used in accordance with the present teachings. Moreover, such detection devices are not limited to one-dimensional optical signal detectors, but can also be arrayed or otherwise chosen or configured to measure two-dimensional effects such as beam refraction and spatial modulation effects.

Figure 2:
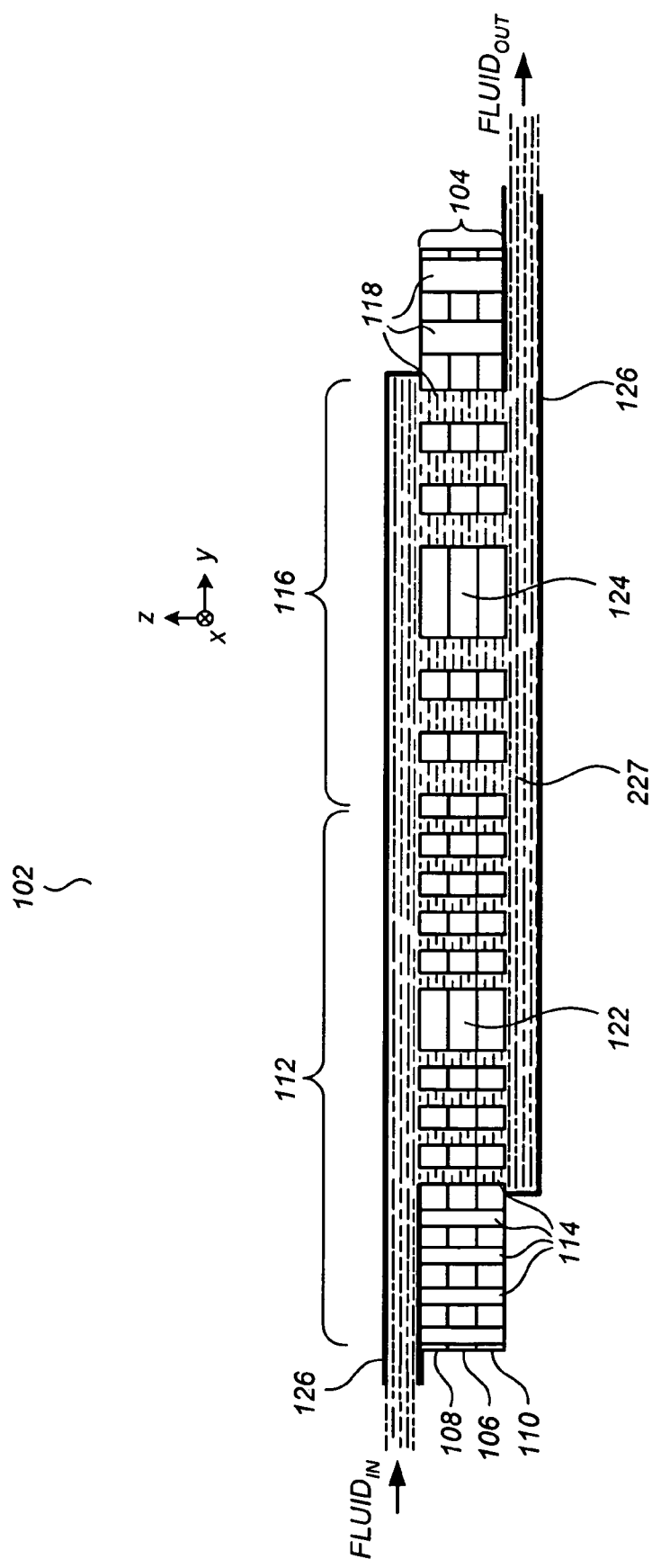
FIG. 2 illustrates a cross-sectional view of the apparatus of FIG. 1.

FIG. 2 illustrates a cross-sectional view of the apparatus 102 at a plane cutting through points p and p' marked in FIG. 1. According to an embodiment, apparatus 102 further comprises a fluid introduction device 126 configured to introduce a common volume of fluid 227 into the channels of the photonic crystals 112 and 116. Preferably, the common volume of fluid 227 forms a collective pool above and/or below the combination of both the first photonic crystal 112 and the second photonic crystal 116, such that different parts of the common volume of fluid 227 are in substantially the same state, e.g., at the same temperature, at the same pressure, etc. The fluid introduction device 126 can include microfluidic pumps and microfluidic conduits as needed to introduce the common volume of fluid 227, which may be in the nanoliter and even picoliter range, over and into the channels 114/118 of the photonic crystals 112/116. As illustrated in FIG. 1, the common volume of fluid 227 occupies an area "F" of the photonic crystals 112/116 that includes at least a portion of the defect pattern waveguides 122/124. Although referenced as $FLUID_{IN}$ and $FLUID_{OUT}$ in FIGS. 1-2, it is to be appreciated that the fluid is not required to be flowing, but rather can be in any static or dynamic condition that allows a common pool thereof to infiltrate the channels 114 and 118 of the differently-patterned photonic crystals 112 and 118.

The fluid introduction device 126 can take many different forms depending on the particular known microfluidic architecture used. In one example, the fluid introduction device 126 is formed by voided volumes within an additional material layer (not shown) above the upper cladding layer 108 and within a substrate layer (not shown) below the lower cladding layer 110. Alternatively, the fluid introduction device 126 can be achieved via an overall architecture of the apparatus 102. For example, the group of layers 104 may be formed atop a plurality of pillars standing in an etched valley of a substrate, the valley then simply being flooded with the fluid to cover the group of layers. Alternatively, the group of layers 104 may extend in cantilever fashion into an enclosed or partially enclosed void that is filled with the fluid. In still another example, the voids among a patterned array of laterally-grown sacrificial nanowires can be filled in a bulk photonic crystal slab material, the laterally-grown sacrificial nanowires then being removed to form the photonic crystals 112/116, and the photonic crystals 112/116 can stand edgewise in a surrounding trench that is filled with the fluid. Fabrication of such device could proceed in a manner similar to that described in the commonly assigned U.S. Ser. No. 10/738,176, filed Dec. 17, 2003, and/or in the commonly assigned U.S. Ser. No. 11/096,669, filed Mar. 31, 2005, each of which is incorporated by reference herein.

According to an embodiment, the input radiation IN is at a frequency near an edge of one or both of the photonic bandgaps of the photonic crystals 112/116. When the fluid is in the channels, even slight perturbations in the photonic bandgap characteristics according to the fluid's refractive index can change the intensity of the signals OUT1 and/or OUT2, the radiation being increasingly guided as the photonic bandgap moves toward the radiation frequency, the radiation being increasingly dispersed and/or dissipated as the photonic bandgap moves away from the radiation frequency.

The apparatus 102 can provide several advantages in sensing a property of a fluid such as the refractive index of the fluid. Precision can be enhanced because the effects of both photonic crystals 112 and 116 can be measured on the same sample volume of fluid at the same time and under precisely the same conditions (e.g., temperature, pressure, external modulation state, etc.), and therefore comparisons between the measurements can be very precise and reliable. For embodiments in which a common radiation source is used, comparison precision and reliability are further enhanced because the source radiation profiles are precisely the same. According to an embodiment, the frequency of the radiation and other device parameters can be selected so that operation occurs on different parts of the photonic bandgap characteristics. The ability to operate at different parts of different photonic bandgap characteristics in a common device under precisely the same conditions can be harnessed to either broaden the range of detectable refractive indices (which can save fluid volume, for example, compared to repeated tests on different devices, and/or which can reduce costs), and/or can further be harnessed to achieve high precision, high reliability in fluid sensing, and ease of device calibration.

FIG. 3 illustrates a top view of a fluid sensing apparatus 302 according to an embodiment, comprising a first photonic crystal 304 integrated into a common slab with a second photonic crystal 306, the photonic crystals 304 and 306 having different channel patterns. The apparatus 302 is configured in a manner similar to apparatus 102 of FIG. 1 to introduce a common fluid volume into the channels across an area "F". However, instead of guiding incident radiation using defect patterns, the photonic crystals 304 and 306 share a common interface 305 for receiving the radiation at a common non-normal input angle $\theta_{IN}$ at a frequency near an edge of a photonic bandgap of one or both of the photonic crystals 304 and 306. The apparatus 302 is further equipped with radiation measurement devices, not shown but known in the art, to measure the angles of refraction $\theta_{OUT,304}$ and $\theta_{OUT,306}$ of the propagated radiation.

According to the so-called superprism effect, for frequencies near the edge of the photonic bandgap, very small changes in the angle of incidence can cause very large changes in the angle of refraction. According to an embodiment, the apparatus 302 is further equipped to perturb the common input angle $\theta_{IN}$ by a relatively small amount $\Delta\theta_{IN}$ and to measure corresponding shifts $\Delta\theta_{OUT,304}$ and $\Delta\theta_{OUT,306}$ in the refracted radiation, for sensing at least one property of the fluid. Advantages similar to those discussed supra in relation to FIGS. 1-2 are brought about, including advantages relating to device precision, reliability, and ease of calibration.

FIG. 4 illustrates a top view of an apparatus 402 for sensing at least one property of a fluid according to an embodiment, comprising an array of differently-patterned photonic crystals 404, 406, 408, and 410 integrated into a common slab. The apparatus 402 is configured in a manner similar to apparatus 102 of FIG. 1 to introduce a common fluid volume into the channels across an area "F" that encompasses at least a portion of each photonic crystal 404-410. The photonic crystals 404-410 each comprise a defect pattern waveguide, the plurality of defect pattern waveguides being non-adjacent (i.e., not connected end-to-end) and having distinct inputs and outputs, in a manner similar to the defect pattern waveguides 122 and 124 of FIG. 1. Advantages similar to those discussed supra in relation to FIGS. 1-2 are brought about, and extended further by the use of additional photonic crystal structures and radiation paths integrated therein. In still other embodiments there can be even more such photonic crystal structures integrated into the common slab. In one embodiment, the incident electromagnetic radiation IN1-IN4 comes from a common optical source. In another embodiment, the incident electromagnetic radiation IN1-IN4 comes from different optical sources. In one embodiment, the electromagnetic radiation incident into at least one of the photonic crystals is at a frequency near the edge of the photonic bandgap of that photonic crystal. In another embodiment, the electromagnetic radiation incident into every one of the photonic crystals is at a frequency near the edge of the photonic bandgap for that photonic crystal.

FIG. 5 illustrates a top view of an apparatus 502 for sensing at least one property of a fluid according to an embodiment, comprising an array of differently-patterned photonic crystals 504, 506, 508, and 510 integrated into a common slab. With respect to microfluidics, the apparatus 502 is configured in a manner similar to apparatus 402 of FIG. 4 to introduce a common fluid volume into the channels across an area "F" that encompasses at least a portion of each photonic crystal 504-510. However, the photonic crystals 504-510 comprise defect patterns that are positioned end-to-end such that a common overall defect path 512 is defined through all of the photonic crystals 504-510. Preferably, the radiation frequency is near the edge of the photonic bandgap of each of the photonic crystals 504-510.

It has been found that having a composite defect path through a plurality of photonic crystals receiving the fluid in their channels can provide for finer tunability and precision in the fluid sensing apparatus. More particularly, the composite defect path can be manipulated to be very responsive at "interesting" refractive index ranges where high precision in measurement may be desired. This is conceptually illustrated in FIG. 6, showing a plot 602 of a measured refractive index versus attenuation corresponding to a uniform defect path, and further showing a corresponding plot 604 for a carefully designed composite defect path such as the path 512 of FIG. 5. Device precision at "interesting" refractive index values is increased because larger attenuation swings are needed for causing a unit change in the measured refractive index.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although sensing devices based on the propagation of optical signals (e.g., infrared, visible, ultraviolet) represents one particularly useful embodiment, electromagnetic radiation in other frequency ranges can be used in other embodiments. By way of further example, it is to be appreciated that in addition to liquids, the sensed fluids can include vapor forms of liquids and gasses.

By way of further example, while the channels of any particular photonic crystal have been illustrated as having uniform cross-sections, in other embodiments the channels may have varying cross-sections, e.g., a first set of channels may have circular cross-sections while a second set of channels may have square or elliptical cross-sections. By way of still further example, although the array patterns of the photonic crystals have been illustrated as varying on a section-by-section basis (e.g., with four distinct sections having four distinct patterns), in other embodiments there may be increased numbers of smaller-sized photonic crystals, with adjacent ones having decreased pattern differences therebetween, such that an overall pattern across the slab appears chirped. Thus, reference to the details of the described embodiments are not intended to limit their scope.

What is claimed is:

1. An apparatus for sensing at least one property of a fluid, comprising:
  a dielectric slab into which is defined a first photonic crystal structure and a second photonic crystal structure, said first and second photonic crystal structures comprising differently patterned arrays of channels extending through said dielectric slab; and
  a fluid introduction device configured to introduce a common volume of the fluid into the channels of said first and second photonic crystal structures;
  whereby the at least one property of the fluid can be sensed by measuring the propagation of radiation through said first and second photonic crystal structures.

2. The apparatus of claim 1, further comprising:
  a radiation introduction device configured to introduce radiation at a common wavelength into said first and second photonic crystal structures; and
  a radiation measurement device configured to measure said radiation upon said propagation through said first and second photonic crystal structures.

3. The apparatus of claim 2, wherein said radiation introduction device is configured to apply an incident wavefront of said radiation to said first and second photonic crystal structures at a common angle at a frequency near an edge of a photonic bandgap of at least one of said first and second photonic crystal structures, and wherein said radiation measurement device is configured to measure an angle of refraction corresponding to each of said first and second photonic crystal structures.

4. The apparatus of claim 3, wherein said radiation introduction device is configured to perturb said common angle, and wherein said radiation measurement device is configured to measure changes in said angles of refraction corresponding to said perturbations of said common angle.

5. The apparatus of claim 1, wherein each of said first and second photonic crystal structures includes a defect pattern defined therethrough, and wherein said radiation is at a frequency near an edge of a photonic bandgap of at least one of said first and second photonic crystal structures.

6. The apparatus of claim 5, wherein said defect patterns of said first and second photonic crystal structures are non-adjacent and have distinct inputs and outputs.

7. The apparatus of claim 5, wherein said defect patterns of said first and second photonic crystal structures are positioned end-to-end such that a composite defect path is defined through said first and second photonic crystal structures, and wherein said frequency is near the edge of the photonic bandgap of each of said first and second photonic crystal structures.

8. The apparatus of claim 1, further comprising a third photonic crystal structure defined in said dielectric slab and having an array of channels patterned differently than said first and second photonic crystal structures, said fluid introduction device being further configured to introduce the common volume of the fluid into the channels of said third photonic crystal structure, said at least one property being further sensed by measuring the propagation of radiation through said third photonic crystal structure.

9. The apparatus of claim 1, wherein said arrays of channels in said first and second photonic crystal structures are differently patterned with respect to at least one of channel pitch, channel cross-sectional shape, type of spatial pattern, and channel cross-sectional size.

10. The apparatus of claim 1, wherein said at least one property of the fluid is a refractive index.

11. A method, comprising:
  introducing a common volume of a fluid into a plurality of columnar channels formed in a dielectric slab, said channels defining an array of photonic crystals in the dielectric slab, each photonic crystal in said array having a different channel pattern than the other photonic crystals in said array;
  introducing electromagnetic radiation into said array of photonic crystals; and sensing at least one property of the fluid by measuring the propagation of said electromagnetic radiation through said array of photonic crystals.

12. The method of claim 11, wherein said electromagnetic radiation is at a frequency near an edge of a photonic bandgap of at least one of said photonic crystals.

13. The method of claim 12, wherein said electromagnetic radiation is at a frequency near an edge of a photonic bandgap of each of said photonic crystals.

14. The method of claim 11, wherein any two of said channel patterns of said plurality of photonic crystals differ with respect to at least one of channel pitch, channel cross-sectional shape, type of spatial pattern, and channel cross-sectional size.

15. The method of claim 14, wherein said at least one property of the fluid is a refractive index.

16. The method of claim 11, said array of photonic crystals forming a common input surface for receiving electromagnetic radiation, wherein said introducing electromagnetic radiation comprises applying an incident wavefront thereof to said common input surface at a non-normal angle at a frequency near an edge of a photonic bandgap of at least one of said photonic crystals, and wherein said sensing at least one property comprises measuring an angle of refraction corresponding to each of said photonic crystals.

17. The method of claim 16, further comprising perturbing said non-normal angle and measure changes in said angles of refraction corresponding to said perturbations.

18. The method of claim 11, wherein each of said photonic crystals includes a defect pattern defined therethrough, and wherein said electromagnetic radiation is at a frequency near an edge of a photonic bandgap of at least one of said photonic crystals.

19. The method of claim 18, wherein said defect patterns of said photonic crystal structures are non-adjacent and have distinct inputs and outputs.

20. The method of claim 18, wherein said defect patterns are positioned end-to-end such that a composite defect path is defined through said array of photonic crystals, and wherein said frequency is near the edge of the photonic bandgap of each of said photonic crystals.

21. A fluid sensing device, comprising:
a first photonic crystal and a second photonic crystal formed into a common slab of bulk material, said first and second photonic crystals comprising differently patterned arrays of channels extending through said common slab;
means for introducing a common volume of the fluid into the channels of said first and second photonic crystals;
means for introducing electromagnetic radiation into said photonic crystals; and
means for measuring the propagation of said electromagnetic radiation through said photonic crystals to sense at least one property of the fluid.

22. The fluid sensing device of claim 21, wherein said means for introducing electromagnetic radiation comprises means for applying an incident wavefront thereof to said photonic crystals at a common angle at a frequency near an edge of a photonic bandgap of at least one of said photonic crystals, and wherein said means for measuring comprises means for determining an angle of refraction corresponding to each of said photonic crystals.

23. The fluid sensing device of claim 21, wherein each of said photonic crystals includes a defect pattern defined therethrough, and wherein said means for introducing electromagnetic radiation provides electromagnetic radiation at a frequency near an edge of a photonic bandgap of at least one of said photonic crystals.

24. The fluid sensing device of claim 23, wherein said defect patterns of said photonic crystals are positioned end-to-end such that a composite defect path is defined therethrough, and wherein said frequency is near the edge of the photonic bandgap of each of said photonic crystals.

25. The fluid sensing device of claim 21, wherein said at least one property of the fluid is a refractive index, and wherein said arrays of channels in said first and second photonic crystals are differently patterned with respect to at least one of channel pitch, channel cross-sectional shape, type of spatial pattern, and channel cross-sectional size.

* * * * *

UNITED STATES PATENT AND TRADEMARK OFFICE
CERTIFICATE OF CORRECTION

PATENT NO. : 7,289,690 B2
APPLICATION NO. : 11/107098
DATED : October 30, 2007
INVENTOR(S) : Zhiyong Li et al.

It is certified that error appears in the above-identified patent and that said Letters Patent is hereby corrected as shown below:

In column 3, line 53, delete "A1N" and insert -- AIN --, therefor.

Signed and Sealed this

Fourteenth Day of July, 2009

JOHN DOLL
*Acting Director of the United States Patent and Trademark Office*